United States Patent [19]
Frederick

[11] 3,938,797
[45] Feb. 17, 1976

[54] CLAMPING DEVICE FOR WELDING SEAMER

[75] Inventor: Arthur I. Frederick, Webster Groves, Mo.

[73] Assignee: The Pandjiris Weldment Co., St. Louis, Mo.

[22] Filed: Jan. 9, 1974

[21] Appl. No.: 431,905

[52] U.S. Cl. ............... 269/20; 219/161; 228/44.1; 269/94; 269/164; 269/239
[51] Int. Cl.² .................. B23K 37/04; B25B 1/18
[58] Field of Search ............ 269/20, 91–94, 269/154, 157, 164, 237–239; 100/266, 269 A; 219/161; 228/44, 49, 50; 248/281, 284

[56] References Cited
UNITED STATES PATENTS

| 2,122,933 | 7/1938 | Eckman | 248/281 X |
| 2,371,376 | 3/1945 | Bisbee | 228/50 |
| 2,430,900 | 11/1947 | Wetzler | 269/238 X |
| 3,543,989 | 12/1970 | Cooper | 228/25 |
| 3,752,465 | 8/1973 | Siegmund | 269/93 |
| 3,788,634 | 1/1974 | Chauvet et al. | 269/154 |

FOREIGN PATENTS OR APPLICATIONS 969,093 | 9/1964 | United Kingdom | 219/161

Primary Examiner—Gerald A. Dost
Assistant Examiner—Neil Abrams
Attorney, Agent, or Firm—Cohn, Powell & Hind

[57] ABSTRACT

This clamping device provides opposed banks of clamping units attached to an associated reaction beam above a work table, for clamping workpiece plates to the table during seam welding. Each clamping unit includes an upright clamping member, having an inclined finger engageable with a workpiece plate, and each member is connected to its reaction beam by a pair of transverse link members: the clamping member, link members and the reaction beam cooperate to provide a four-bar linkage. Downward pressure is applied to the clamping members by an inflatable flexible hose positioned between the lower link member of each unit and an associated reaction beam and the clamping members are upwardly biased by individual return springs extending between the upper link member and the reaction beam. The connection points of the upper and lower link members to the reaction beam are vertically and horizontally adjustable to facilitate alignment of the clamping units with the reaction beam and to vary the location of the pressure point of the inclined finger relative to the workpiece.

10 Claims, 8 Drawing Figures

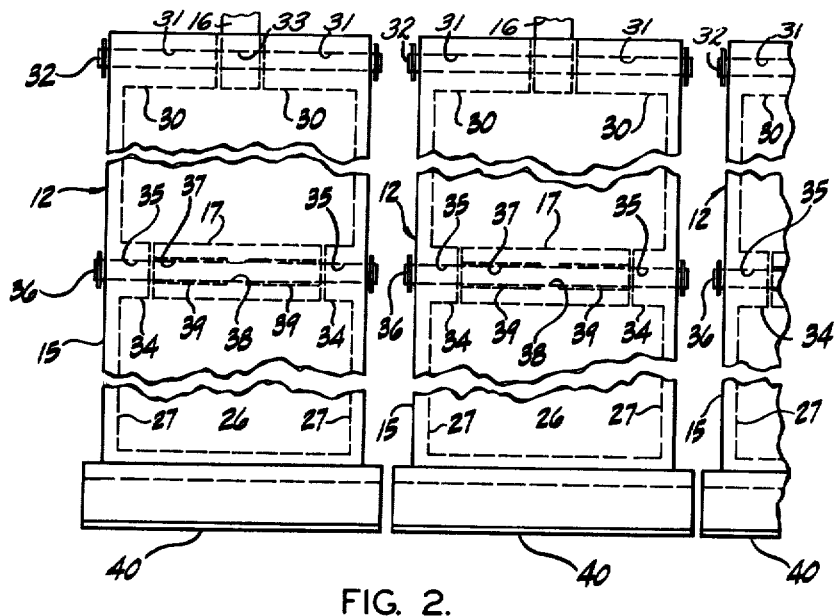
FIG. 2.
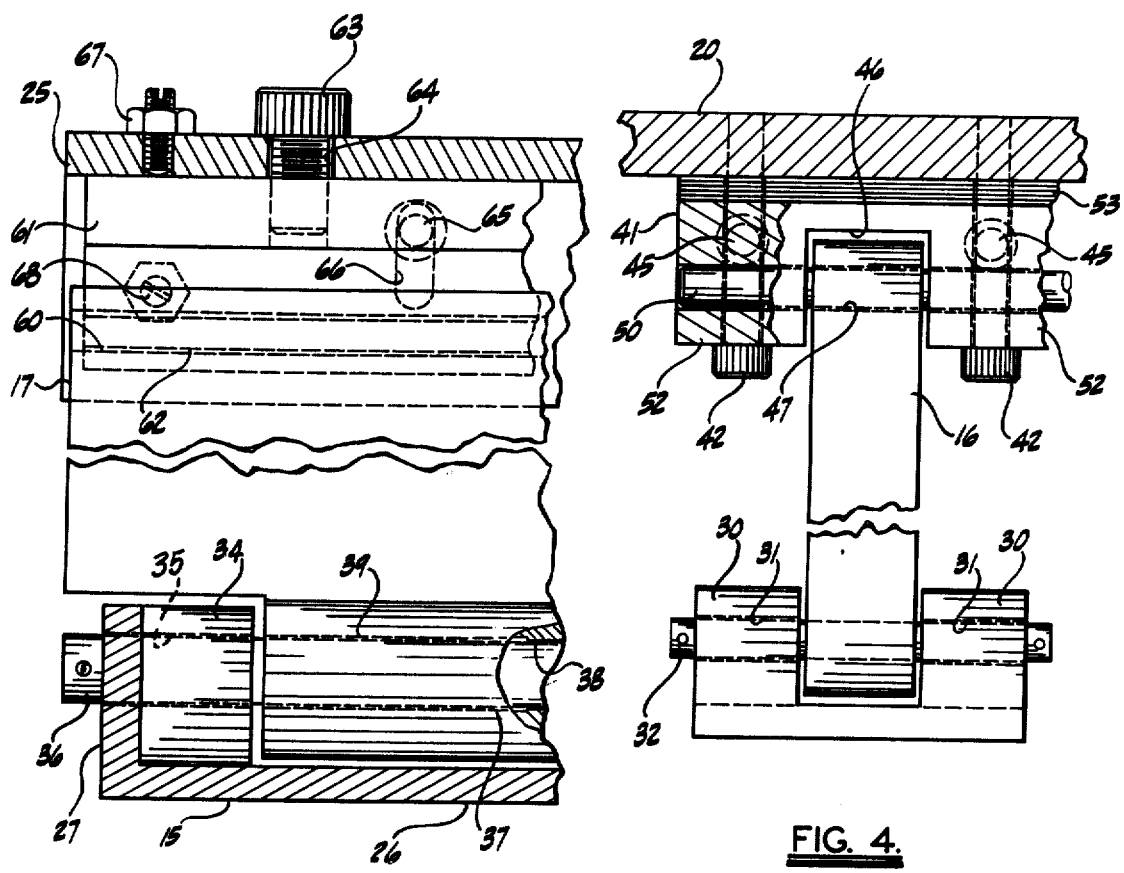
FIG. 3.
FIG. 4.

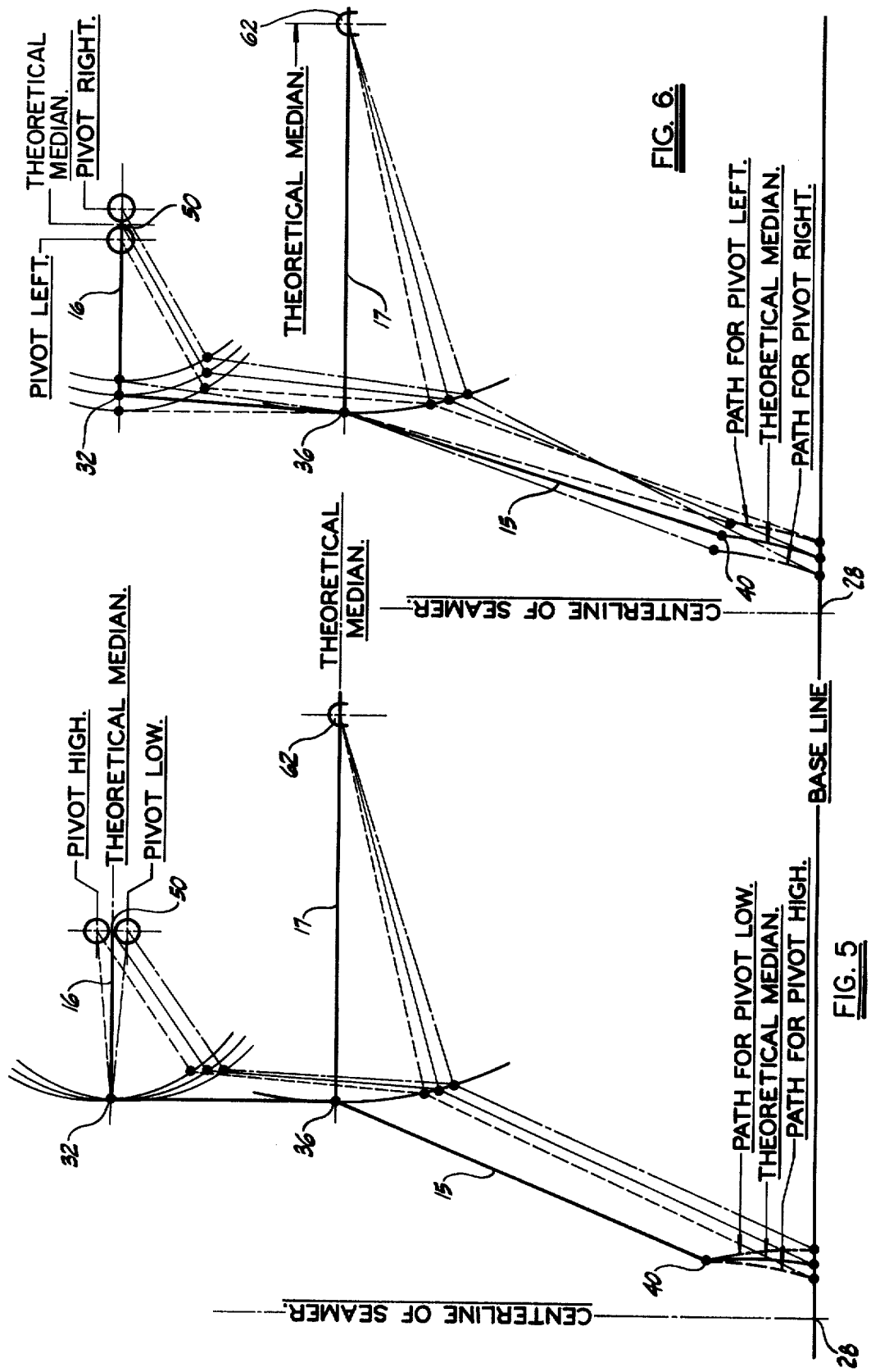

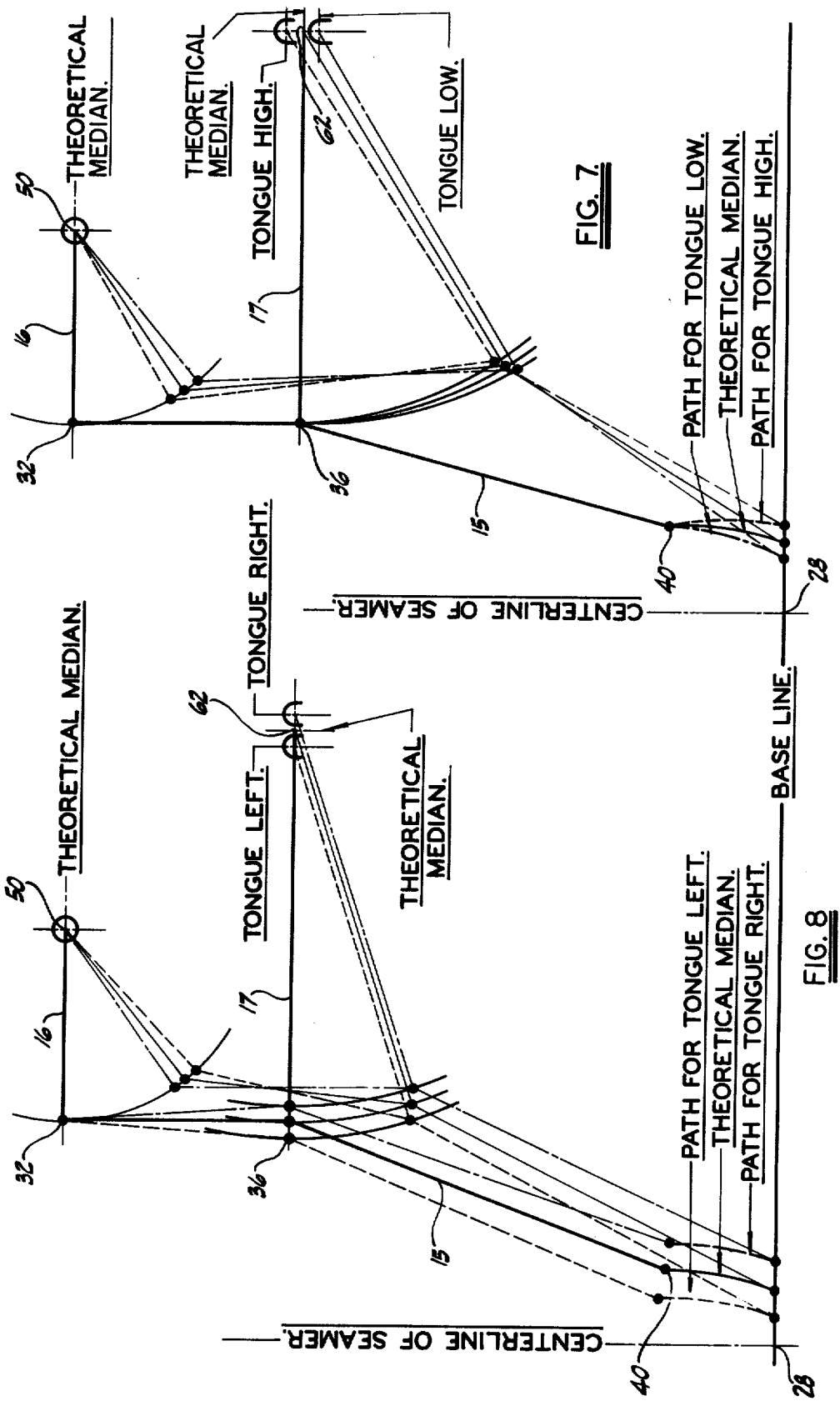

3,938,797

CLAMPING DEVICE FOR WELDING SEAMER

BACKGROUND OF THE INVENTION

This invention relates generally to a clamping device for a seamer and particularly to improvements in a four-bar linkage clamp adapted to position plates edgewise for seam welding.

There are many different clamping devices available for seam welding plate material having the same general purpose as the present device; they can be conveniently considered in terms of two broadly defined groups, namely those referred to as paddle clamps and those referred to as four-bar linkage clamps. In the case of the paddle clamps, the clamping force is applied to each workpiece by a radial arm and the horizontal component of this force tends to urge the workpieces apart. In the case of the four-bar linkage clamps the linkage can be arranged so that the horizontal component of the clamping force tends to urge the workpieces together which is a desirable feature.

Unfortunately, clamping devices using a four-bar linkage system tend to be complicated partly because they must be manufactured to close tolerances so that the individual clamps act in concert. This factor tends to increase the expense of such devices prohibitively. Moreover, in the more common four-bar linkage devices, the pressure levers of the individual clamping units are not readily removable because they are attached to common horizontal pivot shafts of considerable length. Removal of individual clamping units is an advantage because it provides a simple means of avoiding local obstructions on the workpiece such as pimples. Inflatable flexible hoses are the most common medium used for applying the clamping force in seamers. A disadvantage of the common type of four-bar linkage lies in the application of the clamping force from the flexible hose to the clamping member through the relatively indirect medium of a bell crank pressure lever, the flexible hose being disposed between said lever and the sidewall of the reaction beam.

In addition to the above, another disadvantage of known four-bar linkage devices lies in the difficulty of adjusting the location of the linkage pivot points to vary location of the points of pressure to suit workpiece plates of varying thickness. This is a particularly serious problem when longitudinal pivot shafts are used to mount a large number of individual clamping units to an overhead beam because of the common existence of longitudinal misalignment of such overhead beams caused during fabrication.

The present clamping device overcomes these and other problems in a manner not disclosed in the known prior art.

SUMMARY OF THE INVENTION

This clamping device provides opposed banks of individual clamping units, each unit comprising a four-bar linkage clamp pivotally attached to an overhead reaction beam which is spaced from a horizontal work table. The individual clamping units are adjustable to maintain alignment of said units and to vary the location of the clamping pressure points collectively to suit workpiece plates of varying thickness. The vertical clamping pressure is accompanied by a horizontal component which tends to urge the workpiece plates together on the work table.

Each of the individual clamping units includes an upright clamping member, providing a substantially constant clamping force, and transversely related upper and lower link members which are pivotally attached between said clamping member and the reaction beam.

The lower link member provides a pressure lever member and an inflatable flexible hose is disposed between said pressure lever member and the bottom of the reaction beam to provide a substantially vertical clamping force, applied directly to said pressure lever member. The pivotal connection of the pressure lever member to the reaction beam is provided by a cradle which facilitates installation and removal of the individual clamping units from the reaction beam. The downward pressure applied to the pressure lever members by the inflatable hose tends to maintain the cradle parts in engagement during the operation of the device. The pivot connection between the pressure lever member and the clamping member is relatively loose and this, together with the provision of the cradle connection, permits the manufacture of the clamping device without the need for close tolerances.

Each upper link member includes a return spring applying an upward bias to the clamping member and to the pressure lever member, and a lateral bias to the pressure lever member toward the reaction beam which facilitates installation and removal of the individual clamping units.

This clamping device is relatively uncomplicated and is therefore inexpensive to manufacture and can be used by an operator without special instruction.

It is an important object of this invention to provide a plurality of clamping units disposed in side-by-side relation and pivotally attached to an elongate, overhead reaction beam support member at vertically spaced connection points each clamping member unit including an upright clamping member, having upper and lower connection points and an outstanding bearing finger adapted to engage workpiece plates, and upper and lower link members pivotally connecting the clamping member with the spaced connection points on the support member.

It is another object to provide an inflatable flexible hose disposed between the support member and the lower link members, said members thereby constituting pressure lever members, and to apply a force to said lower link members whereby to urge the clamping member into bearing engagement with the workpiece plate; and to provide a resilient means attached between the upper link member and the support member to return the clamping member out of engagement with the workpiece plate when the hose is deflated.

Yet another object of the invention is to provide a pin connection between each upper link member and the support member which is adjustable and includes a journal block mounted to the support member and a plurality of shims disposed between the block and the support member to provide selective horizontal relocation of the pin axis.

A further object is to provide a cradle connection between each lower link member and the support member which includes an abutment block, mounted to the support member and providing an arcuate tongue, and to provide an arcuate groove formed in the lower link member to receive said tongue in pivotal relation, said abutment block being movable to provide selective horizontal relocation of the tongue.

Yet another object is to provide the journal block of the pin connection and the abutment block of the cradle connection with threadedly adjustable means to provide selective vertical relocation of the pin axis and the tongue respectively.

Another object is to provide a connection between each lower link member and clamping member by means of an elongate pin which is received within an elongate bore provided in the lower link member, said bore including a relatively short journal portion and flanking oversize portions to permit relative tilting of each bore and pin axis, and thereby of adjacent clamping members, to ensure substantially uniform engagement of the clamping member bearing edge on the workpiece.

Yet another important object is to provide an inclined tension spring extending between each upper link member and the support member, which applies vertical and horizontal force components tending to urge the upper link member inwardly against the support member and tending to urge the lower link member upwardly against the support member when the hose is in the deflated condition.

BRIEF DESCRIPTION OF THE DRAWINGS

FIG. 2 is a reduced elevational view of adjacent clamping units;

FIG. 3 is an enlarged sectional view taken on line 3—3 of FIG. 1 and illustrating the pressure lever member connections;

FIG. 4 is an enlarged sectional view taken on line 4—4 of FIG. 1 and illustrating the upper link member connections;

FIG. 5 is a schematic illustrating the effect of vertical adjustment of the connection between the upper link member and the reaction beam, on the path of the clamping edge;

FIG. 6 is a schematic illustrating the effect of horizontal adjustment of the connection between the upper link member and the reaction beam, on the path of the clamping edge;

FIG. 7 is a schematic illustrating the effect of vertical adjustment of the connection between the pressure lever member and the reaction beam, on the path of the clamping edge; and FIG. 8 is a schematic illustrating the effect of horizontal adjustment of the connection between the pressure lever member and the reaction beam, on the path of the clamping edge.

DESCRIPTION OF THE PREFERRED EMBODIMENT

Figure 1:
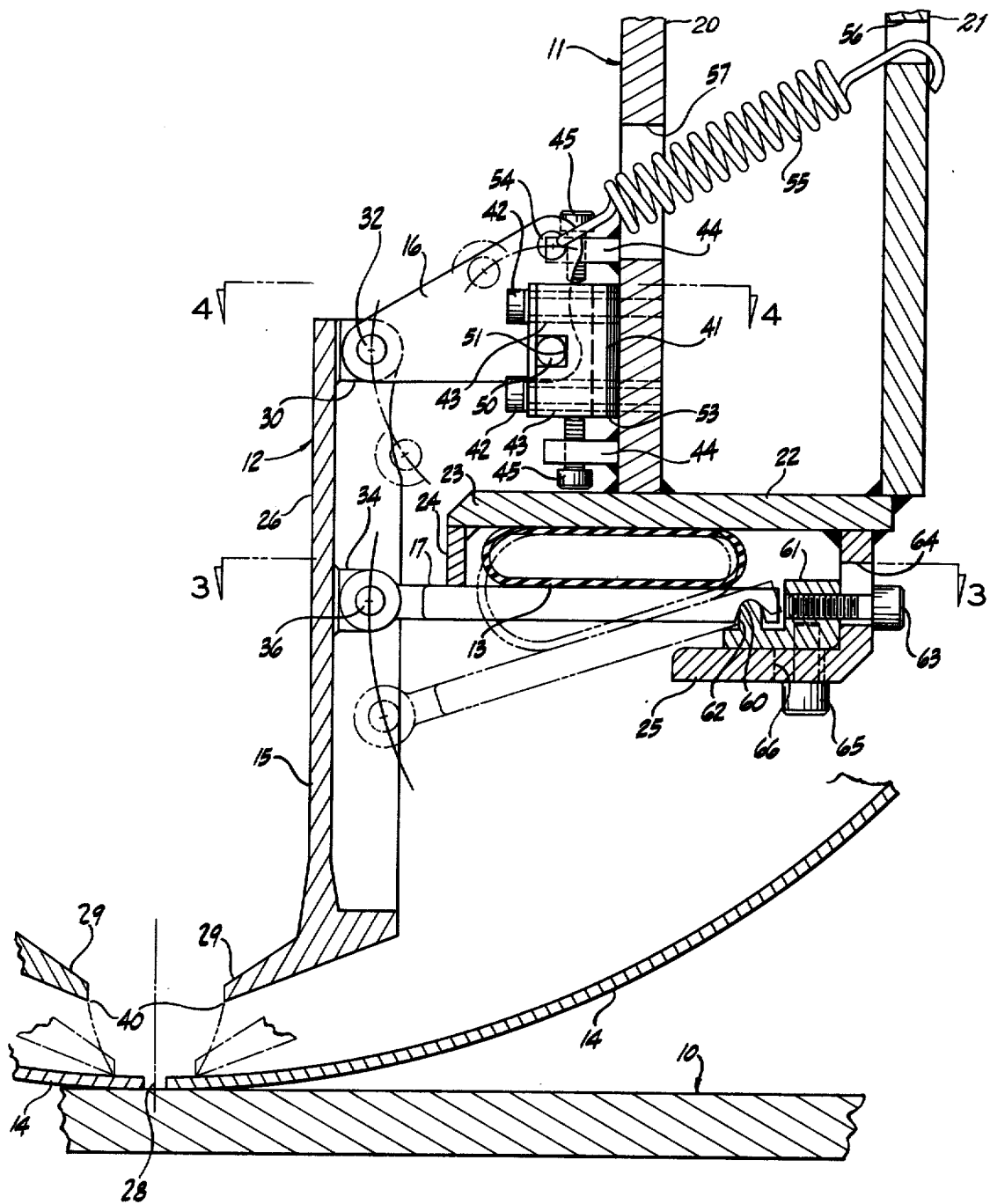
FIG. 1 is a cross section through the reaction beam of the seamer illustrating the connection of a clamping unit to said beam.

Referring now by characters of reference to the drawings and first to FIG. 1 it will be understood that the welding machine with which the clamping device is used includes a work table 10, providing a base, and a longitudinal reaction beam 11, which is attached to the base in the conventional manner and is vertically spaced from the table as shown to provide an overhead support member. The reaction beam 11 carries a plurality of clamping units generally indicated by numeral 12, which are mounted in side-by-side relation along the length of the beam 11 as shown in FIG. 2. It will be understood that the clamping units 12 are pivotally mounted to the reaction beam 11 and can be lowered by means of an inflatable flexible hose 13 to clamp a workpiece such as the curved plate 14 to the table 10 and to locate the plate 14 accurately in edgewise relation to a corresponding plate 14, which is similarly clamped to the table 10, so that said plates can be properly spaced for seam welding.

Each clamping unit 12 includes a substantially vertical clamping member 15 which is pivotally connected to the reaction beam 11 by means of an upper link member 16 and a lower link member 17, said lower link member 17 constituting a pressure lever member. In effect, the reaction beam 11 cooperates with the clamping member and the upper and lower link members to provide a four-bar linkage assembly.

The reaction beam 11 includes front and rear plates 20 and 21 and a bottom plate 22 having an outwardly extending portion 23. A continuous keep plate 24 depends from the outer end of the bottom plate 22, and an ell-shaped seat 25 depends from the other end of said bottom plate. The keep plate 24 and the ell-shaped seat 25 are coextensive with the bottom plate and serve purposes which will be described later.

In the preferred embodiment the clamping member 15 is a weldment having a front portion 26 and spaced side portions 27 as best shown in FIG. 2. At the upper end the clamping member 15 is provided with a pair of journal blocks 30 having bores 31 aligned to receive a pivot pin 32. The blocks 30 are spaced to accommodate the upper link member 16, and said link member 16 is provided with a bore 33 which also receives the pivot pin 32, said pin 32 defining a first point of connection on the clamping member 15 at which it is connected to the upper link member 16. Intermediate its upper and lower end the clamping member 15 is provided with another pair of spaced journal blocks 34 having bores 35 adapted to receive a pivot pin 36. The blocks 34 are spaced to accommodate the pressure lever member 17 and said lever member is provided with a bore 37 which also receives the pin 36, said pin 36 defining a second point of connection on the clamping member 15 at which it is connected to the pressure lever member 17. The bore 37 is provided with a relatively short intermediate bearing portion 38 and counterbored flanking portions 39. This structural arrangement of parts permits slight tilting of the clamping member 15 relative to the pin 36 and facilitates alingment of adjacent clamping members.

At its lower end the clamping member 15 includes an inclined, outstanding finger 29 having a bearing edge 40, which is adapted to provide a line of pressure engagement with the workpiece 14.

As shown in FIGS. 1 and 4 the upper link member 16 is pivotally connected to the front plate 20 of the reaction beam 11 by means of a connector block 41. The connector block 41 is mounted to said front plate 20 by means of a plurality of threaded fasteners 42, and the block 41 is provided with vertically elongate slots 43, which permit vertical adjustment of said block. Outstanding lugs, indicated by numeral 44, are provided above and below said block 41, each lug receiving a pair of set screws 45 to facilitate vertical adjustment of the block. As clearly shown in FIG. 4 the connector block 41 includes a notch 46 which accommodates the upper link 16. The link 16 is provided with an aperture 47 which receives a pivot pin 50 defining a first point of connection of the reaction beam 11 at which the upper link member 16 is connected. The connector block 41 is provided with an open-ended recess 51 at each side of the notch 46 which receives the pin 50 and is closed by cover plates 52. Removal of the plates 52 permits the pin 50 to be readily withdrawn from the connector block 41. The connector block 41, and therefore the pivotal connection defined by pin 51, is horizontally adjustable by means of a plurality of shims 53. The connector block 41 and the attachment thereof constitutes a first adjustment means providing compound movement of the first connection point.

The upper link member 16 is substantially triangular in configuration and, as shown in FIG. 1 includes an aperture 54 which receives one end of a return spring 55. The other end of the return spring 55 is connected to the rear plate 21 of the reaction beam 11, an aperture 56 being provided in said rear plate 21 for this purpose. An aperture 57 is provided in the front plate 20 to receive said spring 55 in clearance relation. It will be understood that any downward movement of the clamping member 15 is resisted by said return spring 55, which provides a potential vertical component of force on the clamping member 15 by virtue of the upper link member 16 to which it is connected.

A second point of connection of the reaction beam 11 at which the pressure lever member is connected is clearly shown in FIGS. 1 and 5. The connection is defined by a rocker or cradle means and the cradle members are provided by an arcuate recess 60 in the member 17, and an elongate tongue 62 on an abutment block 61 which is received by said recess 60. The abutment member 61 and hence the pivotal connection provided by the cradle means is adjustable relative to the ell-shaped seat 25 by which it is carried. The adjustment is provided by means of a pair of threaded fasteners 63 which extend through a vertically elongate slot 64 and are threadedly received by the abutment member 61, and by a pair of threaded fasteners 65 which are received by horizontally elongate slots 66. Set screws, such as those indicated in FIG. 3 by numerals 67 and 68, are provided adjacent each of the threaded members 66 and 65 respectively to facilitate accurate positioning of the abutment member tongue 62. The abutment member 61 and the attachment thereof constitutes a second adjustment means providing compound movement of the second connection point of the reaction beam 11.

It is thought that the structural features and functional advantages of this clamping device have become fully apparent from the foregoing description of parts, but for completeness of disclosure, the operation and adjustment of the device will be briefly described with particular reference to FIG. 1 and FIGS. 5-8.

FIG. 1 illustrates the position of the clamping unit 12 in the raised condition with the adjustable pivot points, represented by upper pin 50 and the tongue 62, in the median positions. In this raised condition the bearing edge 40 of each clamping finger 29 is disposed above the workpiece 14, and is spaced from the center line of the seamer, which is indicated by numeral 28. When the flexible hose 13 is expanded to exert pressure on the pressure lever member 17, this member pivots in a counterclockwise direction about the tongue 62 and the clamping member 15 descends against the resistance of the return spring 55 until the bearing edge 40 engages and clamps the workpiece 14 to the table 10. The lowered condition of the clamping unit 12 is shown in fragmentary fashion in phantom outline in FIG. 1.

It can be seen from the path of the bearing edge 40, that said edge moves toward the seamer center line 28.

The bearing edge 40 follows this path because the radius of the upper link member 16 is less than that of the pressure lever member 17. Thus, there is a horizontal component of the clamping force which tends to urge the workpiece plates 14 together rather than apart. Moreover, in the expanded condition the hose exerts a horizontal component on the lever member 17 tending to urge said member into engagement with the tongue 62 which provides a secure connection at this location.

When the flexible hose 13 is deflated, the inclined spring 55 returns the clamping unit 12 to its original position. The residual pull in the return spring 55 is sufficient to provide a vertical component to urge the pressure lever member 17 upwardly into engagement with the keep plate 24, and a horizontal component to urge the pivot pin 50 into the open-ended recess 51 and into engagement with the connection block 41. This structural arrangement of parts ensures that the tongue and groove connection cannot be inadvertently disengaged and further provides that a simple cover plate 52 is all that is necessary to maintain the pivot pin 50 in position within the recess 51. The advantage of this latter feature is that the pin 50, and therefore the upper link member 16, can very easily be disconnected from the reaction beam 11. Further, because of the tongue and groove connection the pressure member 17 can also be easily removed. Thus, an individual clamping unit 12 can be pulled clear from a bank of such units.

As shown in FIGS. 2 and 3, the pressure lever member 17 includes a bore 37 receiving the pin 36, which serves to connect said pressure lever member 17 to the clamping member 15. This bore 37 includes a relatively short intermediate portion 38 receiving the pin 36 in journal relation. The outer portions 39 on the other hand are oversize. This mounting arrangement at one end of the pressure lever member 17, in combination with the tongue and groove arrangement at the other end of said member 17 permits the clamping member 15 to be tilted slightly. Thus, the engagement of the clamping finger bearing edge 40 is, to some extent, self-aligning and this alignment is achieved without the close tolerances and accuracy of machined parts which is usually necessary in order to achieve full line bearing.

The adjustment of the location of the pivot pin 50 and tongue 62 offers several advantages. For example, and with reference to FIGS. 1, 3 and 4, the location of the clamping edge 40, relative to the seamer center line 28, can be accurately determined and can be adjusted to suit various thicknesses of workpiece plates 14. In addition, the provision of shims 53 between the connector block 41 and the reaction beam 11 permits an initial alignment of adjacent journal blocks 41 to compensate for undesirable curvature in the reaction beam 11 caused during fabrication. Once this initial misalignment condition has been corrected, shims can be added or removed equally behind each connector block 41 to adjust the horizontal position of the pivot 50. The vertical adjustment of pin 50, on the other hand, is achieved by slackening fasteners 42, adjusting set screws 45 to move the block 41 to the desired location, and then tightening the fasteners 42.

With regard to horizontal adjustment of the tongue 62, this is achieved by slackening fasteners 63 and 65, adjusting set screws 67 to the desired location and then tightening fasteners 63 and 65. Vertical adjustment is similarly achieved by slackening fasteners 63 and 65, adjusting set screws 68 to the desired location and then tightening fasteners 63 and 65.

FIGS. 5–8 illustrate schematically the change in the path of the bearing edge 40 which results from adjustment, both vertical and horizontal, of the pivot pin 50 and the tongue 62. For convenience, each adjusted position is shown independently with reference to the theoretical median position of the clamping member 15 illustrated in FIG. 1. In the preferred embodiment the movements under consideration, for purposes of example, are of the order of plus or minus ± ¼ inch for a clamping member having a length of 12 inches.

FIG. 5 illustrates the effect of vertical adjustment of the pivot pin 50 above and below the median position. The path of the bearing edge 40 in the pivot high position is shown in broken outline and in the pivot low position in phantom outline. The location of the bearing edge 40 in the raised position of the clamping member 15 remains substantially unchanged regardless of whether the pivot pin 50 is high or low. However, the location of the bearing edge 40 in the lowered position of the clamping member 15 changes significantly as a result of divergence of the path of said edge from the median path. FIG. 6 illustrates the effect of horizontal adjustment of the pivot pin 50 to the right and to the left. The path of the bearing edge 40 in the pivot left position is shown in broken outline and in the pivot right position in phantom outline. The change in the location of the bearing edge 40 in the raised position of the clamping member 15 is significant and it can be seen that movement of the pivot pin 50 in one direction results in movement of the bearing edge 40 in the opposite direction. The path of the bearing edge 40 as it is lowered substantially parallels that of the median path.

FIG. 7 illustrates the effect of vertical adjustment of the tongue 62 above and below the median position. The path of the bearing edge 40 in the tongue-high position is shown in broken outline and in the tongue-low position in phantom outline. The location of the bearing edge 40 in the raised position of the clamping member 15 remains substantially unchanged regardless of whether the tongue 62 is high or low. However, the location of the bearing edge 40 in the lowered position of the clamping member 15 changes significantly as a result of divergence of the path of the edge 40 from the median path. FIG. 8 illustrates the effect of horizontal adjustment of the tongue 62 to the right and to the left. The path of the bearing edge 40 in the tongue-left position is shown in broken outline and in the tongue-right position in phantom outline. The change in the location of the bearing edge 40 in the raised position of the clamping member 15 is significant and it can be seen that movement of the tongue 62 in one direction results in movement of the bearing edge 40 in the opposite direction. The path of the bearing edge 40 as it is lowered substantially parallels that of the median path.

It will be clear from the above that the provision of two adjustable points of connection to the reaction beam, each having vertical and horizontal adjustment capability, affords considerable versatility of movement with respect to the relocation of the clamping edge 40, and it will be understood that, although the adjustments have been described separately, they can be combined to provide a cumulative effect. For example, by raising the pivot 50 (FIG. 5) the clamping edge 40 is moved toward the centerline 28. By moving the tongue 62 to the left the clamping location of bearing edge 40 is also moved toward the centerline 28. This movement toward the centerline 28 is cumulative. Thus, relatively large movements of the bearing edge 40 can be achieved with relatively small movements of the individual connection points. This feature is particularly useful in that it permits thick workpiece plates and corrugated workpiece plates to be clamped as close to the centerline 28 as desired.

The structural arrangement of the clamping member 15 and the link members 16 and 17 together with the application of the clamping force directly to the lower link or pressure lever member 17 from the flexible hose 13, in cooperation with return spring 55 results in a substantially constant vertical clamping force over the entire clamping stroke. As the hose 13 expands and the pressure lever member 17 goes down, the angular force vector of the upper triangular link member 16 increases the down pressure.

The line of action of the clamping force can be changed from shallow to steep by varying the lengths of the transverse links, ie the upper link 16 and the pressure lever member 17. In addition, relatively small changes in the line of action can be made by varying the positions of the pivot pin 50 and the tongue 62.

I claim as my invention:

1. In a clamping device for a seamer:
   a. a base including a workpiece table,
   b. a support member spaced above the table and including first and second connection points,
   c. a clamping unit including:
      1. a clamping member transversely disposed of said table and having a bearing end adapted to engage a workpiece on the table, a first connection point disposed in lengthwise spaced relation from said bearing end, and a second connection point disposed between said bearing end and said first connection point,
      2. a link member pivotally connected between the first connection point of the support member and the first connection point of the clamping member,
      3. a pressure lever link member pivotally connected between said second connection point of the support member and the second connection point of the clamping member, and
      4. adjustable means for varying the path of the bearing end,
   d. an inflatable flexible hose disposed between the support member and the pressure lever link member to apply a force to said pressure lever link member between the connection points to the support member and the clamping member,
   e. means for inflating the hose to rotate the pressure lever link member about the second connection point of the support member to urge the bearing end of the clamping member into engagement with the workpiece,
   f. means for returning the clamping member out of engagement with the workpiece when the hose is deflated,
   g. said clamping member being substantially vertical, and including an inclined outstanding finger at the lower end providing a bearing edge at the bearing end, and
   h. the horizontal distance between the link member pivotal connections to the clamping member and support member being less than the horizontal distance between the pressure lever link member pivotal connections to provide relative movement of said bearing edge laterally away from said support member as said bearing edge is urged toward said workpiece table.

2. In a clamping device for a seamer:
   a. a base including a workpiece table,
   b. a support member spaced above the table and including first and second connection points,
   c. a clamping unit including:
      1. a clamping member transversely disposed of said table and having a bearing end adapted to engage a workpiece on the table, a first connection point disposed in lengthwise spaced relation from said bearing end, and a second connection point disposed between said bearing end and said first connection point,
      2. a link member pivotally connected between the first connection point of the support member and the first connection point of the clamping member,
      3. a pressure lever link member pivotally connected between said second connection point of the support member and the second connection point of the clamping member, and
      4. adjustable means for varying the path of the bearing end,
   d. an inflatable flexible hose disposed between the support member and the pressure lever link member to apply a force to said pressure lever link member between the connection points to the support member and the clamping member,
   e. means for inflating the hose to rotate the pressure lever link member about the second connection point of the support member to urge the bearing end of the clamping member into engagement with the workpiece,
   f. means for returning the clamping member out of engagement with the workpiece when the hose is deflated,
   g. cradle means connecting the pressure lever link member to the support member at the second connection point, said cradle means including a tongue on the support member and a cooperating recess in the pressure lever link member, said recess receiving the tongue with a fit to substantially preclude movement of said pressure lever link member along a line connecting said second connection points but to permit separation of said pressure lever link member from the support member in a direction transverse to said line.

3. In a clamping device for a seamer:
   a. a base including a workpiece table,
   b. a longitudinal support member spaced above the table and including a plurality of longitudinally spaced upper connection points and a plurality of longitudinally spaced lower connection points,
   c. a plurality of clamping units disposed in side-by-side relation lengthwise of said support member, each clamping unit including:
      1. a substantially upright clamping member having upper and lower connection points and an outstanding bearing finger adapted to engage a workpiece on the table,
      2. an upper link member having one end pivotally connected to the clamping member at the upper connection point, and
      3. a lower pressure lever link member, pivotally connected to the clamping member at the lower connection point,
   d. pin connection means pivotally connecting the other end of each upper link member to the support member at an associated upper connection point of the support member,
   e. cradle connection means pivotally connecting the other end of each pressure lever link member to the support member at an associated lower connection point of the support member,
   f. at least one of said connection means including an adjustable mounting for varying the path of the bearing finger,
   g. an inflatable flexible hose disposed between the support member and the pressure lever link members to apply a force to said pressure lever link members between the ends thereof,
   h. means for inflating the hose to rotate the pressure lever link members about the lower connection points of the support member to urge the bearing fingers into engagement with the workpiece, and
   i. resilient means extending between the support member and each clamping unit for returning the clamping member out of engagement with the workpiece when the hose is deflated.

4. A clamping device for a seamer as defined in claim 3, in which:
   j. the resilient means includes an inclined tension spring extending between the upper link member and the support member and applying a vertical force component to the clamping member tending to urge said member upwards, and a horizontal force component to the pin connection means tending to urge the pin connection means toward the support member, and
   k. said vertical force component urges said pressure lever link member into engagement with the support member when the hose is in the deflated condition.

5. A clamping device for a seamer as defined in claim 3, in which:
   j. the adjustable mounting for the pin connection means includes:
      1. a connector block mounted to the support member,
      2. a pin received by the connector block and pivotally connected to the upper link member, and
      3. a plurality of shims disposed between the block and the support member to provide selective horizontal relocation of the pin axis.

6. A clamping device for a seamer as defined in claim 5, in which:
   k. the adjustable mounting for the pin connection means includes means adjustably mounting the connector block to the support member for selective vertical relocation of the pin axis.

7. In a clamping device for a seamer:
   a. a base including a workpiece table,
   b. a longitudinal support member spaced above the table and including a plurality of longitudinally spaced upper connection points and a plurality of longitudinally spaced lower connection points,
   c. a plurality of clamping units disposed in side-by-side relation lengthwise of said support member, each clamping unit including:
      1. a substantially upright clamping member having upper and lower connection points and an outstanding bearing finger adapted to engage a workpiece on the table,
      2. an upper link member having one end pivotally connected to the clamping member at the upper connection point, and 3. a lower pressure lever link member, pivotally connected to the clamping member at the lower connection point,
d. pin connection means pivotally connecting the other end of each upper link member to the support member at an associated upper connection point of the support member,
e. cradle connection means pivotally connecting the other end of each pressure lever link member to the support member at an associated lower connection point of the support member,
f. at least one of said connection means including an adjustable mounting for varying the path of the bearing finger,
g. an inflatable flexible hose disposed between the support member and the pressure lever link members to apply a force of said pressure lever link members between the ends thereof,
h. means for inflating the hose to rotate the pressure lever link members about the lower connection points of the support member to urge the bearing fingers into engagement with the workpiece,
i. resilient means extending between the support member and each clamping unit for returning the clamping member out of engagement with the workpiece when the hose is deflated, and
j. the cradle connection means including:
 1. an abutment block mounted to the support member and providing an elongate arcuate tongue, and
 2. an elongate arcuate groove formed in the pressure lever member and receiving said tongue in pivotal relation.

8. A clamping device for a seamer as defined in claim 7, in which:
 k. the cradle connection means includes means adjustably mounting the abutment block to the support member for selective horizontal relocation of the tongue.

9. A clamping device for a seamer as defined in claim 7, in which:
 k. the cradle connection means includes means adjustably mounting the abutment block to the support member for selective vertical relocation of the tongue.

10. A clamping device for a seamer as defined in claim 7, in which:
 k. the finger includes an elongate bearing edge,
 l. an elongate pin connects each pressure lever link member to its associated clamping member at the lower connection point of said clamping member, the
 m. each pressure lever link member includes an elongate bore receiving the pin, said bore including a relatively short intermediate journal portion and a relatively long oversize flanking portions to permit slight relative tilting of each bore axis and pin axis to provide a substantially uniform engagement of the clamping member bearing edge with the workpiece.

* * * * *